INVENTORS
HENRI G. BUSIGNIES
ARCHIBALD D. SMITH Jr.
BY
ATTORNEY

Patented Aug. 12, 1952

2,607,032

UNITED STATES PATENT OFFICE 2,607,032

RADIO DIRECTION AND LOCATION DETERMINING SYSTEM

Henri G. Busignies, Forest Hills, and Archibald D. Smith, Jr., Amityville, N. Y., assignors to Federal Telephone and Radio Corporation, Newark, N. J., a corporation of Delaware Application January 30, 1943, Serial No. 474,143

11 Claims. (Cl. 343—11)

This invention relates to radio location determining apparatus, and more particularly to receiver systems for indicating the direction line between the receiver and a radiating source.

Systems have been proposed for indicating the direction line of a source of radiation by the use of two directional antennae having overlapping patterns of radiant action or single antennae having dual characteristics throughout. These systems generally operate by use of a switching system, which serves to couple the antennae alternately to a receiving apparatus in the output of which is an indicator. By comparison of the signal received on the two directive antennae, the direction of the radiating source may be determined.

It is a principal object of our invention to provide a receiving arrangement utilizing alternately coupled directive antennae for determining the direction line of a radiating source with respect to a receiving point.

It is a further object of our invention to provide a direction indicating system effectively operative on short pulse radiations.

It is a still further object of our invention to provide a direction indicating apparatus with a visual indicator in which the visual indications may be adjusted as to relative location, and/or amplitude.

According to a feature of our invention, we provide a pair of adjustable directive antennae arranged so that their directive patterns overlap along a predetermined line. Further switching means are provided for alternately coupling these antennae to a receiver and for applying the output of the receiver to a visual indicator. The switching means or another switching system operated synchronously therewith also serves to provide separate indications on the visual indicator for the signals received on individual antennae. The directive antennae may then be adjusted in position so that by comparison of the individual indications the directional position of the radiating source may be obtained. It is clear that this directional indication may be either in azimuth or in elevation.

It is contemplated that a direction finder in accordance with our invention may be particularly useful in connection with radio location apparatus of the type wherein impulse energy is reflected from an interfering object, the position of which it is desired to obtain.

A better understanding of our invention and the objects and features thereof may be had from the particular description thereof made with reference to the accompanying drawing in which.

Figure 1:
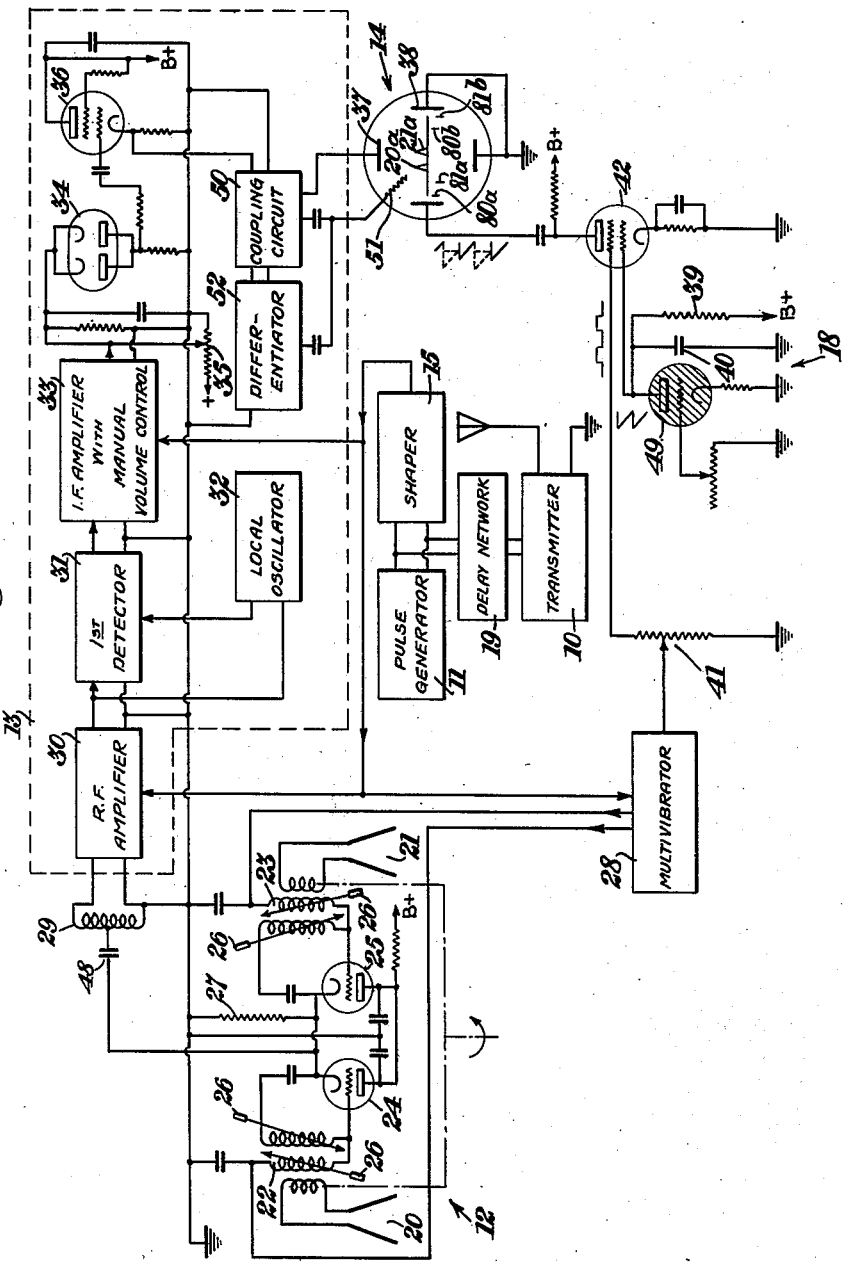
Figure 1 is a diagrammatic showing of an obstacle detecting system incorporating a receiver in accordance with our invention.

Turning first to Figure 1, 10 represents a transmitter for a radio obstacle detecting apparatus which transmits pulses applied to it over delay network 19 from pulse generator 11 to a reflecting object. These pulses, after reflection are received on antenna system 12, after which they are applied to the receiver system 13, the output of which is coupled to an indicator 14. Pulses from generator 11 are applied over a shaper network 15 to block receiver 13 during periods of transmission from the transmitter 10. Shaper network 15 broadens the blocking pulses so that they overlap the transmitted pulses, which have been slightly delayed in network 19.

Antenna system 12 comprises two directive antenna units 20, 21 coupled over transformers 22, 23 to the input circuit of electron tubes 24, 25. Transformers 22, 23 are preferably tunable by means of copper slugs 26, which may be adjusted within the transformer coils to tune the circuit to the operating radio frequency. This frequency preferably should be the same as the frequency of transmitter 10, so that the reflected waves may be readily received. In the output of both tubes 24 and 25 is provided a common cathode resistor 27. A square wave generator 28, which may be of the multi-vibrator type, has its output waves applied to the grids of tubes 24 and 25, to render these tubes alternately conductive. Thus, the received signal will produce a voltage drop across resistor 27 alternately from the separate antennae 20 and 21. The voltage drop across resistor 27 is applied over coupling condenser 48 to input coil 29 of the RF amplifier 30. Preferably, this input is coupled to a point on coil 29, which will provide suitable impedance matching of the system.

The output signals from amplifier 30 are applied to a first detector 31, together with oscillations from local oscillator 32 to produce an intermediate frequency. I. F. amplifier 33 then further amplifies the intermediate frequency energy from first detector 31. Preferably, I. F. amplifier 33 is provided with a known form of manual volume control, so that the energy level at its output may be adjusted. Energy from I. F. amplifier 33 is then applied to second detector 34, herein illustrated as a duo-diode. This diode detector is provided with a level control adjustment 35, so that the detector will not respond to energy below a predetermined level. The detected signals in the output of 34 are then amplified in audio frequency amplifier 36, and applied over coupling circuit 50 to the vertical deflecting electrodes 37 of indicator 14.

A second lead from coupling circuit 50 is applied to a control grid 51 of the oscillograph 14. Normally, the grid is biased to produce a dim trace on the screen. As the amplitude of the signal increases, the brilliance of the trace increases providing brighter outlines for the wanted signals, which are greater in amplitude than the usual noise signals.

A third lead from coupling circuit 50 is applied to a differentiating circuit 52, which produces a positive peak corresponding to the leading edge of the pulse output from 36. This positive peak is applied to grid 51 to produce a brilliant spot on the indicator which may be used as a reference point for distance indications.

Figure 2:
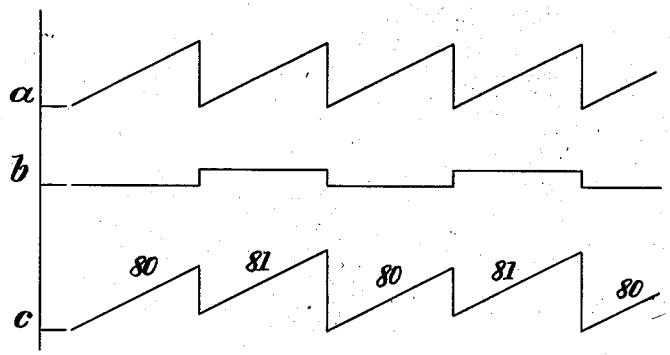
Figure 2 is a set of curves used to explain the operation of a portion of the indicating receiver.

The sweep voltage for indicator 14 may be of the sawtooth form and is derived from a sawtooth generator 18, comprising a gas discharge tube 49, resistor 39 and condenser 40. A positive voltage is applied over resistor 39 to the anode of tube 49 and to condenser 40. The voltage on the anode slowly builds up until sufficient voltage is applied to the anode to initiate ignition of the tube. The ignition of tube 49 serves to discharge condenser 40, after which the cycle is repeated. This produces an output wave of the general form shown in curve A of Fig. 2. Any desired type of sweep generator may be used, in place of the particular circuit illustrated. The output of the multi-vibrator 28 is applied over adjustable resistor 41 to produce a controllable amplitude square wave of the form generally shown at B of Figure 2. The outputs from generator 18 and multi-vibrator 28 are applied to separate grids of a mixing tube 42. Thus, an addition of curves A and B of Fig. 2 is provided, producing a combined sweep voltage curve of the form shown generally at C in Fig. 2. It should be noted that alternate oscillations 80, 81 of curve 3 produce sweeps of the same amplitude, but initiated at different voltage levels. This sweep voltage is then applied to the horizontal sweep electrodes 38 of oscillograph indicator 14. It is clear that these waves will thus produce alternate sweeps of the cathode ray beam extending between points 80a and 80b and points 81a and 81b, respectively.

Since the switching of the antennae 20 and 21 operates in synchronism with the shifting of the sweep on oscillograph 14, energy received on the antennae will produce peak indications reproduced at different points on the screen of the oscillograph, as indicated at 20a and 21a. The relative spacing between these indicating peaks may be adjusted by changing the amplitude of the square waves by means of the resistor arrangement 41. For the purpose of comparing the signals to determine the direction, it is only necessary to adjust the directive position of antennae 20, 21 until peaks 20a, 21a are of equal amplitude. Because of the division of the image, the signal peaks will normally tend to be only half as brilliant as they would otherwise be. Any noise energy present will be correspondingly split, but as it may be substantially continuous there will be more overlap tending to make this noise appear with greater brilliance on the screen than the completely separated signal pulse. The signal pulses, however, are greater in amplitude, and the grid control mentioned above, therefore, serves, at least partially, to compensate for this effect.

Should there be considerable noise present at lower amplitude than the direction indicating signals, potentiometer 35 may be adjusted so that these low level interfering signals are eliminated. Thus, peaks 20a, 21a may be clearly produced on the screen of the oscillograph without the accompanying noise indications. Furthermore, if it is desired to increase the amplitude of pulse indications 20a, 21a, it is merely necessary to adjust the manual volume control of amplifier 31 to the desired level.

The antenna system 12, together with the receiver 13 and indicator 14 may be used for determining direction, independently of transmitter arrangement 10 if desired, and may respond to directly transmitted waves, rather than reflected energy. Likewise, any desired type of receiver may be used, instead of the superheterodyne type illustrated. It should also be clearly understood that instead of a cathode ray oscillograph indicator, any suitable type of comparison indicator may be used. Even a pair of headphones in which the audio amplitude of the signals is compared may be used for a rough indication of direction, if desired.

The provision of cathode resistor 27 for the purpose of coupling the output of antennae 20, 21 to the receiver insures a faithful reproduction of the received signals and avoids some of the difficulties in maintaining impedance matching inherent when the anode voltage is used as an output. Furthermore, the use of copper slugs for tuning transformers 22, 23 avoids the use of tuning condensers and a consequent capacitive coupling between tubes 24 and 25, which would then have to be compensated.

Figure 3:
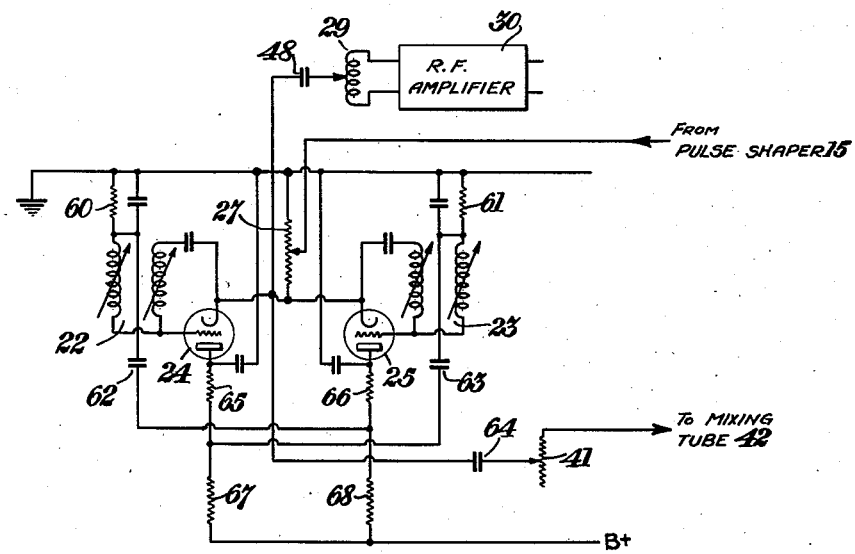
Figure 3 is a modification of a portion of the circuit of Figure 1.

In the circuit shown in Fig. 1, multi-vibrator 28 has been shown for effecting switching of the antenna and control of the sweep voltage. The antenna switching tubes 24, 25 may, however, be connected to operate as a multi-vibrator so that the separate unit is unnecessary. Such a modified circuit adapted to replace certain parts of the apparatus of Fig. 1 for this purpose is shown in Fig. 3.

In this modification, the grid circuits of tubes 24, 25 are provided with additional resistors 60, 61, respectively, which are connected with the anodes of tubes 25 and 24, respectively, over condensers 62, 63. As thus connected, the tubes are alternately biased to pass the signal applied over input transformers 22, 23. The multi-vibrator action of the circuit serves to accomplish the switching without the additional multi-vibrator of Fig. 1.

The output of the multi-vibrator formed by tubes 24, 25 is also applied to the mixing tube 42 over coupling condenser 64 and resistance 41.

The condensers in this circuit also act as radio frequency bypass condensers but high impedance for multi-vibrator waves. Condensers 62, 63 and resistors 60, 61, 65, 66, 67 and 68 serve as constants for the multi-vibrator. Tubes 24, 25 are normal switching radio frequency tubes. Resistances 67 and 68 may be adjusted to control the balance of the circuit and resistances 60 and 61 may be adjusted to vary the speed of the multi-vibrator action.

The synchronizing pulses from shaper 15 are applied over resistance 27, which preferably offers a high impedance to R. F., but a comparatively low impedance to the synchronizing signal.

While we have described our invention applied to a preferred embodiment and particular modifications thereof, it should be distinctly understood that this description is made merely by way of example, and should not be considered as a limitation of the scope of our invention as set forth in the objects thereof and in the appended claims.

What is claimed is:

1. In a system for indicating the direction of a source of radiation, having a first and second directive antenna arranged to have overlapping fields of radiant action, a receiver for the energy received on said antennae and an indicator for providing an indication of direction, the combination with a switching arrangement of the type serving alternately to couple said first and second antennae to said receiver to provide a comparison signal for direction indications, comprising two electron tubes each having an anode, a control grid, and a cathode, means for applying radio frequency energy from said antennae to said grids, a common cathode resistor for said tubes carrying radio frequency energy, means to alternately render said tubes conductive, and coupling means across said common resistor for applying radio frequency energy to said receiver.

2. A system according to claim 1, further comprising switching means operative in timed relation with said switching arrangement for controlling said indicator simultaneously with said antenna switching to produce separately recognizable indications of the signals from the two antennae.

3. A system according to claim 1, wherein said last-named means comprises circuit connections for connecting said tube for operation as a multivibrator.

4. A system according to claim 1, wherein said indicator is in the form of a cathode ray oscillograph having a first and second angularly related deflection means, further comprising means for applying the output of said receiver to said first deflection means to cause deflections in response to said signals from said alternately coupled antennae, and means for alternately applying sweep voltages at different potential levels to said second deflection means in synchronism with the operation of said switching means, to provide lateral displacement of the signals from said first and second antennae.

5. A system according to claim 1, wherein said indicator is in the form of a cathode ray oscillograph having a first and second angularly related deflection means, further comprising means for applying the output of said receiver to said first deflection means to cause deflection in response to said signals from said alternately coupled antennae, and means for alternately applying sweep voltages at different potential levels to said second deflection means in synchronism with the operation of said switching means to provide lateral displacement of the signals from said first and second antennae, and means in said receiver for variably cutting off the lower portions of the received signals.

6. A system according to claim 1, wherein said indicator is in the form of a cathode ray oscillograph having a first and second angularly related deflection means, further comprising means for applying the output of said receiver to said first deflection means to cause deflections in response to said signals from said alternately coupled antennae, means for alternately applying sweep voltages at different potential levels to said second deflection means in synchronism with the operation of said switching means, to provide lateral displacement of the signals from said first and second antennae, means in said receiver for variably cutting off the lower portions of the received signals, and manual volume control means for controlling amplification in said receiver to adjust the relative magnitude of received indications.

7. In a system for indicating the direction of a source of radiation, having a first and second directive antenna arranged to provide overlapping fields of radiant action, a receiver for the energy received on said antennae and a switching arrangement of the type serving alternately to couple said first and second antennae to said receiver to provide a comparison signal for direction indications; and indicator for providing an indication of direction, comprising a cathode ray oscillograph having a first and second angularly related deflection means, means for applying the output of said receiver to said first deflection means to cause deflections in response to said signals from said alternately coupled antennae, means for alternately applying sweep voltages at different potential levels to said second deflection means to provide lateral displacement of the signals from said first and second antennae, means in said receiver for variably cutting off the lower portions of the received signals, and manual volume control means for controlling amplification in said receiver to adjust the relative magnitude of received indications.

8. In echo apparatus, the combination of means including a source of periodic pulses for transmitting recurrent pulses of radiant energy, a radiant energy receiving system for receiving echoes of said transmitted pulses and having two angularly related directive axes, a receiver connected to said receiving system by a pair of transmission channels, one for each directive axis, and switching means controlled by said source of periodic pulses for rendering said transmission channels alternately operative in synchronism with said pulses, whereby said receiver alternately receives echo energy from first one directive axis and then the other.

9. Echo apparatus according to claim 8 wherein said switching means comprises a pair of electron discharge relay devices connected in said channels respectively, means connecting said relay devices for operation as a multivibrator, and including a connection from said source of periodic pulses for synchronizing the operation of said multivibrator.

10. In echo apparatus, the combination of means including a source of periodic pulses for transmitting recurrent pulses of radiant energy, a radiant energy receiving system for receiving echoes of said transmitted pulses and having two receiving channels for receiving radiant energy along two angularly related directive axes, a receiver connected to said receiving system, and switching means controlled by said source of periodic pulses to effect the alternate transmission of echo energy from said two channels to said receiver in synchronism with said pulses.

11. A direction finder comprising first and second directive antennae arranged to receive radio frequency waves, a receiver, a pair of vacuum tube relay devices having their input circuits connected respectively to said first and second antennae and having a common cathode resistor in their output circuits, a connection for applying radio frequency waves to said receiver from said cathode resistor, means connecting said pair of tubes for operation as a multivibrator to generate a square-topped wave, a sweep circuit generator for producing sawtooth waves having a frequency equal to twice the frequency of said square topped waves, an oscillograph indicator having first and second deflector means arranged at right angles to one another, means applying the output of said receiver to said first deflecting means, and means applying said sawtooth sweep waves and said square-topped waves to said second deflecting means.

HENRI G. BUSIGNIES.
ARCHIBALD D. SMITH, JR.

REFERENCES CITED

The following references are of record in the file of this patent:

UNITED STATES PATENTS

| Number | Name | Date |
|---|---|---|
| 2,122,499 | Stocker | July 5, 1938 |
| 2,143,178 | Wright | Jan. 10, 1939 |
| 2,189,549 | Hershberger | Feb. 6, 1940 |
| 2,231,929 | Lyman | Feb. 18, 1941 |
| 2,276,699 | Preisig | Mar. 17, 1942 |
| 2,279,021 | Cooper | Apr. 7, 1942 |
| 2,279,246 | Podliasky et al. | Apr. 7, 1942 |
| 2,284,475 | Plebanski | May 26, 1942 |
| 2,305,930 | Martinelli | Dec. 22, 1942 |
| 2,312,203 | Wallace | Feb. 23, 1943 |
| 2,356,922 | Eltgroth | Aug. 29, 1944 |
| 2,410,657 | Hershberger | Nov. 5, 1946 |
| 2,410,702 | Berkoff | Nov. 5, 1946 |
| 2,412,702 | Wolff | Dec. 17, 1946 |
| 2,422,361 | Miller | June 17, 1947 |

FOREIGN PATENTS

| Number | Country | Date |
|---|---|---|
| 503,471 | Great Britain | Apr. 6, 1939 |